United States Patent
Kerr

[15] 3,653,493
[45] Apr. 4, 1972

[54] CONVEYOR APPARATUS

[72] Inventor: Douglas M. Kerr, Richardson, Tex.

[73] Assignee: Stewart Engineering Equipment Company, Inc., Richardson, Tex.

[22] Filed: June 1, 1970

[21] Appl. No.: 42,346

[52] U.S. Cl............................................198/189, 198/136
[51] Int. Cl......................................B65g 17/00, B65g 15/00
[58] Field of Search..................198/181, 182, 189, 195, 136; 74/246

[56] References Cited

UNITED STATES PATENTS

| | | | |
|---|---|---|---|
| 3,094,206 | 6/1963 | Stewart et al. | 198/189 |
| 2,870,902 | 1/1959 | Rada et al. | 198/181 |
| 3,270,862 | 8/1966 | Goldberg | 198/189 |
| 2,704,943 | 3/1955 | Harris | 74/246 |

Primary Examiner—Richard E. Aegerter
Attorney—Walter J. Jagmin

[57] ABSTRACT

A conveyor apparatus having an endless conveyor which includes an elongate draw member or chain articulated for pivotal movement about mutually perpendicular longitudinally spaced axes so that the conveyor may in its closed path of movement change direction about both vertical and horizontal axes. A conveyor having a central longitudinal draw member or chain articulated for pivotal movement about mutually perpendicular longitudinally spaced axes and having a support member mounted on the draw member which extends laterally outwardly in both directions from the draw member in a convoluted or zig zag manner, the support member being connected to the draw member at longitudinally spaced locations by means permitting pivotal movements of intermediate alternate parallel portions of the support member which extend perpendicularly and horizontally relative toe the draw member about longitudinally spaced perpendicular axes.

9 Claims, 9 Drawing Figures

Patented April 4, 1972

INVENTOR.
Douglas M. Kerr

BY Walter J. Jaym
ATTORNEY

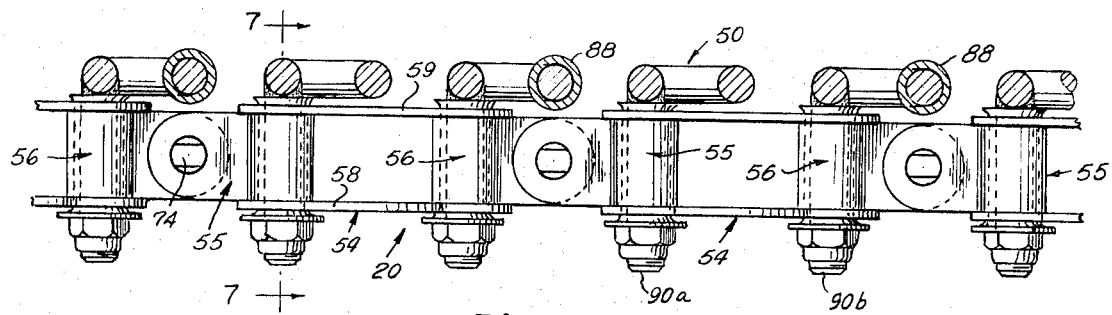
Fig. 5
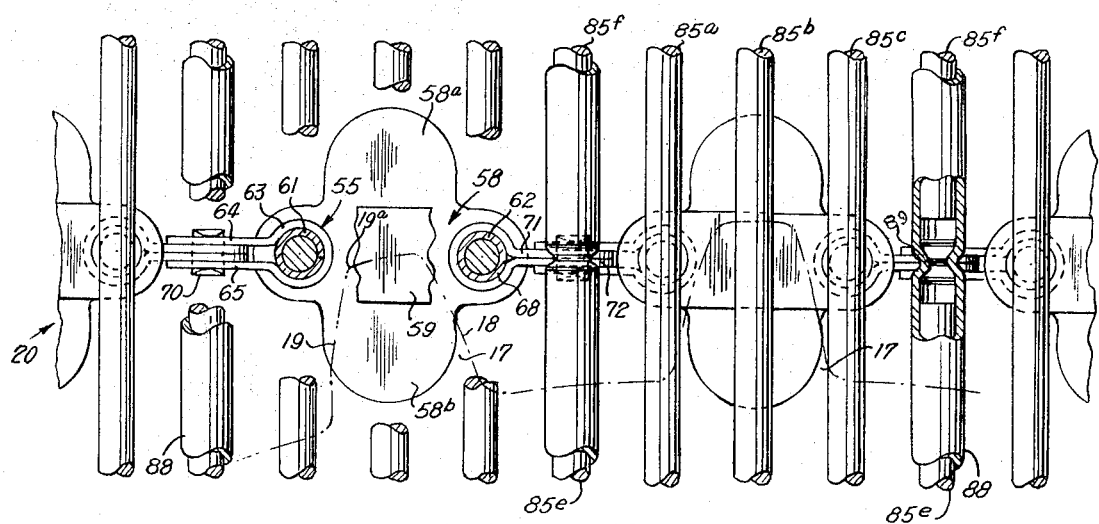
Fig. 6
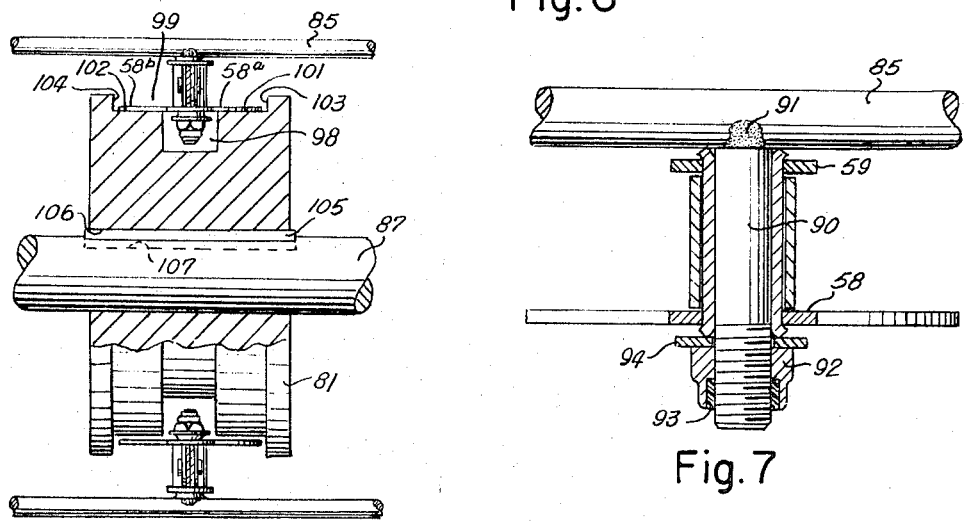
Fig. 8
Fig. 7
INVENTOR.
Douglas M. Kerr
BY
Walter J. Jayson
ATTORNEY

CONVEYOR APPARATUS

This invention relates to conveyor apparatus.

Conveyor systems such as that disclosed in the patent to Donald W. Green and Douglas M. Kerr, U.S. Pat. No. 3,363,744, issued Jan. 16, 1968, have an endless conveyor movable in a closed path requiring the conveyor to turn at certain locations about horizontal axes and at others about vertical axes. Such conveyors have endless longitudinal draw members or chains to which laterally outwardly extending support members are connected for supporting articles to be transported by the conveyor and the support members are slidably supported laterally outwardly of the draw member on suitable slide members or ribs.

It is desirable that such draw member or chain be of simple economical structure while providing the required articulation about mutually perpendicular longitudinally spaced axes and that the frictional and strain forces to which the support members are subjected in sliding over the slide bars and at the locations of changes of direction of the conveyor be minimized since the support member must be of light weight and since the conveyor must obviously operate for prolonged periods of time.

Accordingly, it is an object of this invention to provide a new and improved conveyor apparatus having an endless conveyor whose endless draw member is articulated for pivotal movement about mutually perpendicular longitudinally spaced locations to permit it to change directions about both horizontal and vertical axes.

Another object is to provide a conveyor of the type described having a convoluted support member having parallel portions which extend perpendicularly to and laterally outwardly of the central draw member in opposite directions for supporting articles to be transported by the conveyor.

Still another object is to provide a conveyor, of the type described, wherein the portions of the support member extending laterally outwardly at each side of the draw member are capable of movement relative to the draw member and resilient movement relative to each other to relieve or minimize strains and stresses in the support member.

A further object is to provide a conveyor apparatus, of the type described, wherein the support member is movably connected to the elongate draw member at central points of alternate parallel portions thereof to permit the parallel portions to pivot relative to the draw member.

A still further object is to provide a conveyor, of the type described, wherein the support member is formed of sections each pivotally connected at two locations to a link assembly of the draw member and having opposite ends slidably and rotatably connected to adjacent support member sections at locations adjacent and parallel to locations of pivotal connections of adjacent link assembly for pivotal movement about axes perpendicular to the axes of pivotal connections of the support member section to the link assembly.

An important object of the invention is to provide a new and improved draw member or chain for conveyors of economical simple construction and to which article support means may be easily and quickly connected.

Another object is to provide a conveyor draw member formed of a plurality of link assemblies, each having a pair of parallel link plates connected at opposite ends by tubular connectors, adjacent ends of adjacent link assemblies being connected by connector members pivotally mounted on their tubular connectors, adjacent connector members being connected to one another for pivotal movement about an axis perpendicular to the axes of their pivotal connections to the tubular connectors of the pair of link assemblies.

Still another object is to provide a conveyor wherein the support member formed of a resilient convoluted resilient rod or wire having parallel straight portions extending perpendicularly to the draw member, every alternate straight portion being pivotally connected to the draw member by a stud which extends through the tubular connector of a link assembly of the draw member.

Additional objects and advantages of the invention will be readily apparent from the reading of the following description of a device constructed in accordance with the invention, and reference to the accompanying drawings thereof, wherein:

FIG. 5 is an enlarged sectional view taken on line 5—5 of FIG. 4;

FIG. 6 is a fragmentary enlarged view of the conveyor illustrated in FIG. 5 with some parts broken away;

FIG. 7 is a sectional view taken on line 7—7 of FIG. 5;

FIG. 8 is a fragmentary sectional view with some parts broken away taken on line 8—8 of FIG. 2; and, FIG. 9, is a fragmentary sectional view showing a roller for changing the direction of movement of the conveyor.

Figure 1:
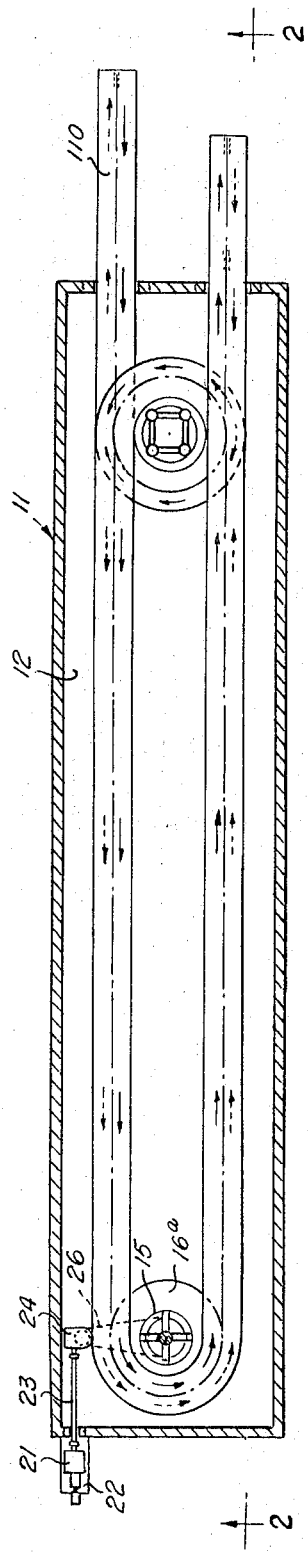
FIG. 1 is a schematic sectional view of a conveyor apparatus embodying the invention taken on line 1—1 of FIG. 2.

Referring now to the drawing the conveyor apparatus 10 embodying the invention may be employed in a conveyor system of the type disclosed in U.S. Pat. No. 3,363,744 issued to Donald W. Green and Douglas M. Kerr to transport articles in a pre-determined path during a pre-determined period of time. For example, it may be desired to move food products through a freezing chanber or oven in order the the food products be frozen or baked, or to cool the food products. The conveyor is supported for movement in two vertically aligned loops in the chamber on a suitable frame means, illustrated and described fully in U.S. Pat. No. 3,363,744 and therefore not shown here, which rotatably supports a vertical drive frame 15 having upper and lower sprocket rings 16a and 16b rigid therewith which have a plurality of sprocket teeth 17, FIG. 6. The sprocket lugs have arcuate outwardly convergent vertical side surfaces 18 and 19 and outer vertical end surfaces 19a which, as will be explained, below engage the draw member 20 of the conveyor to drive the conveyor. The drive frame 15 and therefore the sprocket rings which are secured thereto is rotated by a suitable prime mover, such as an electric motor 21 which is preferably located exteriorly of the housing 11 and may be mounted on a suitable platform or base 22 rigidly secured to the wall of such housing. The drive shaft of the motor is connected by a suitable connector shaft 23 which extends through a suitable aperture or suitable passage in the wall of the housing to the input shaft of a speed reducing device or transmission 24. The output shaft of the speed reducing transmission and the drive frame are connected by a suitable chain 26 which extends about the sprockets rigidly secured to the vertical drive frame 15 and the output shaft of the speed reducing transmission 24. The conveyor apparatus also includes a frame assembly, FIG. 3, on which are slidably mounted upper and lower carriages 31a and and 31b on which are rotatably mounted sprocket rings 32. The particular means for mounting the drive frame and the carriages 31a and 31b are fully described in U.S. Letters Pat. No. 3,363,744.

Figure 3:
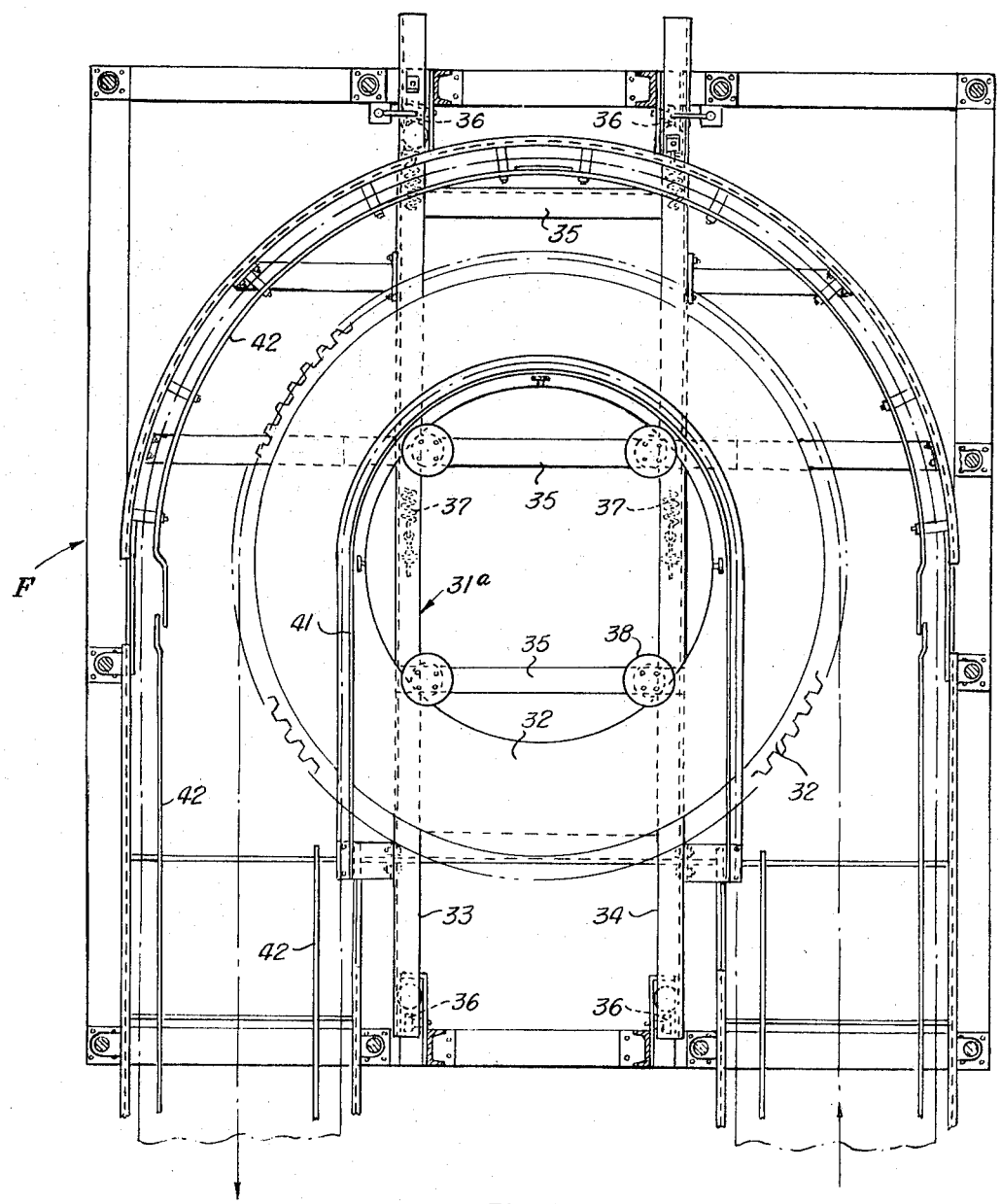
FIG. 3 is a fragmentary sectional view, with some parts broken away, of a movable carriage of the apparatus showing the means for mounting it on the frame.
Figure 4:
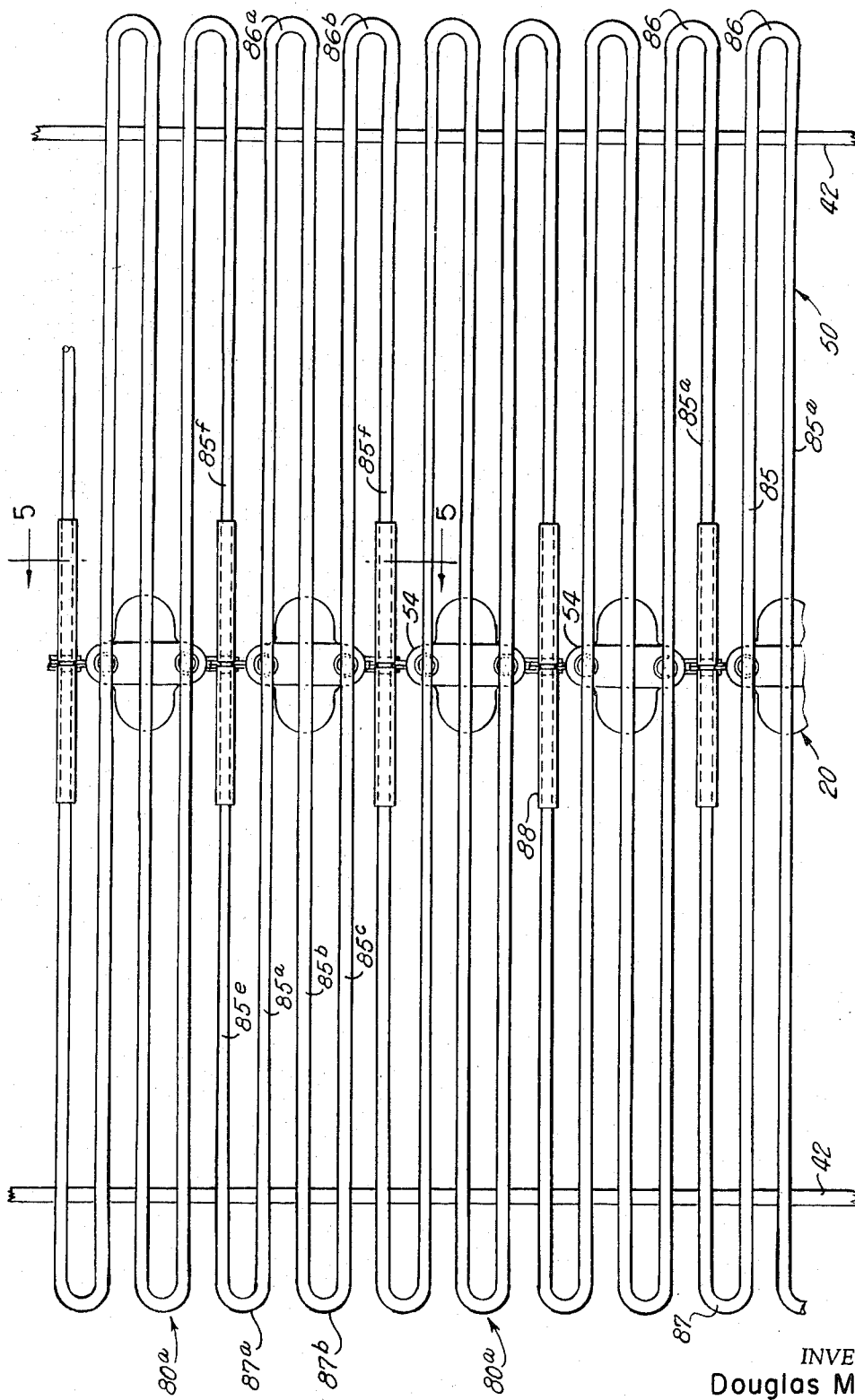
FIG. 4 is a fragmentary top view showing the conveyor embodying the invention.

The carriage 31a includes a pair of longitudinally extending angle members 33 and 34 rigidly connected by transverse members 35, the longitudinal angle members being supported on rollers 36 for longitudinal movement relative to the frame, the carriage being biased upwardly as seen in FIG. 3, by means of springs 37 which are connected to the frame and to the carriage. The sprocket ring 32 is rotatably mounted on the carriage for rotation about a vertical axis by means of four bearing assemblies 38, the sprocket ring extending between vertically spaced annular flanges of the bearing assemblies. The lower carriage 31b is similarly movably supported and carries a sprocket ring 32, but is biased, as seen in FIG. 32, to the left by its associated springs whereas the carriage 31a is biased to the right by its springs. Anti-friction slide members or ribs 41 secured to the carriages and similar slide members 42 secured to the support frame F of the conveyor apparatus support the support member 50 of the conveyor 14 secured to its draw member 20. The endless draw member, FIGS. 4, 5 and 6, includes a plurality of link assemblies 54, adjacent ends of adjacent link assemblies being connected by connector members 55 and 56. Each link assembly 54 includes a pair of parallel spaced inner and outer link plates 58 and 59, which are rigidly connected to one another by a pair of tubular connectors 61 and 62. The outer end portions of the tubular connectors extend through aligned apertures in the link plates and are rigidly secured thereto in any suitable manner, as by swedging of the outer end portions thereof.

Each of the connector members 55 has a central substantially cylindrical portion 63, which is rotatably disposed about the tubular connector 61 and between the plates 58 and 59 of a link assembly 54, and a pair of vertical parallel extensions 64 and 65. Each of the connector members 56 similarly has a substantially cylindrical portion 68 disposed about the tubular connector 62 of a link assembly and straight abutting extensions 71 and 72 which extend between the spaced extensions 64 and 65 of an adjacent connector member 55. The extensions of the adjacent and engaging pairs of connector members 55 and 56 are pivotally secured to one another by a rivet 74 which extends through aligned apertures in the extensions.

Each pair of interconnected connector members 55 and 56 is pivotal about the axis of the rivet 74 which connects them and the connector members 55 and 56 are pivotal about the parallel axes of the connector members 61 and 62, respectively, on which they are mounted. The draw member is thus articulated at longitudinally spaced locations for pivotal movement about mutually perpendicular longitudinally spaced axes.

Figure 2:
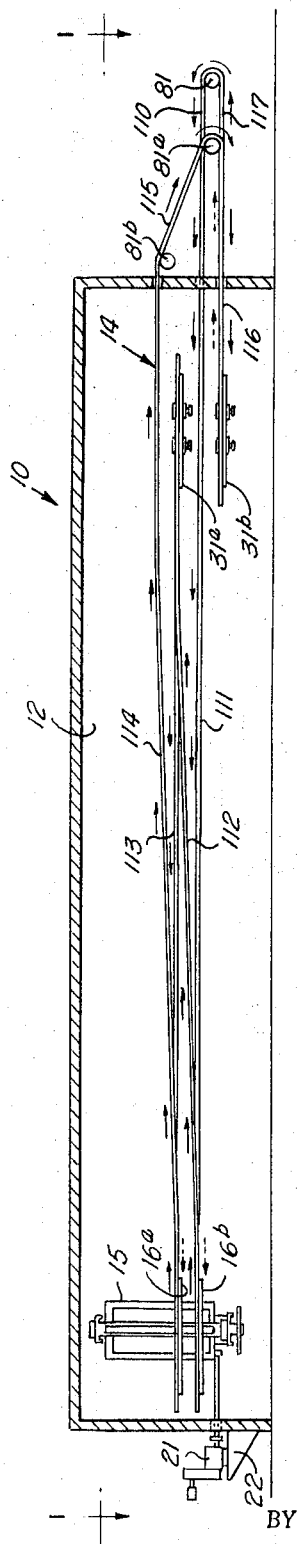
FIG. 2 is a schematic sectional view taken on line 2—2 of FIG. 3.

The draw member thus can curve or flex about vertical axes of the tubular connectors of the link assemblies as it moves about the various sprocket rings of the drive frame and the movable carriages and can curve or flex about the horizontal axes of the rivets 74 as it moves about direction changing rollers rotatable about horizontal axes, such as the direction changing rollers 81, 81a and 81b, FIG. 2.

The teeth of the sprockets are receivable between the outer and inner plates 58 and 59 of the link assemblies and are engageable with the outer surfaces of the cylindrical portions 68 and 63, respectively, of the connector members 55 and 56, respectively. In the case of the teeth of the sprocket rings 16, the engagement of the edge surfaces 18 of their teeth with the portions 68 moves the draw member and in the case of the idler sprocket ring 32 the engagement of the cylindrical portions 63 of the connector members 55 causes the idler sprocket rings to be rotated by a draw member.

Each inner link plate 58 of each link assembly 54 has lateral extensions 58a and 58b for a purpose to be described below.

The convoluted support member 50 of the conveyor is formed of an elongate somewhat resilient member, such as a metal rod or wire having a plurality of horizontal straight parallel portions 85, each straight portion being connected at one end to an adjacent straight portion longitudinally spaced therefrom in one direction by a bight portion 86 and at its other end being connected to the adjacent straight portion spaced therefrom in the opposite direction by a bight portion 87. The support member is formed of a plurality of sections 80 with adjacent end portions of the sections being connected by sleeves, such as the sleeves 88.

Each of the sections 80a includes three straight parallel portions 85a, 85b and 85c and a pair of end portions 85e and 85f. The straight portions 85a and 85b are connected by a bight portion 86a, the straight portions 85b and 85c are connected by a bight portion 87b, the parallel portion 85c is connected to the end portion 85f by the bight portion 86b, and the other end portion 85e is connected to the straight portion 85a by the bight portion 87a. The end portions 85a and 85f are somewhat shorter than half the length of the full straight portions. Adjacent end portions 85f and 85e of adjacent support member sections extend slidably into opposite ends of the sleeve 88 which may be crimped or provided with a central obstruction 89 to limit movement of the sleeve on the end portions of the support member sections which it connects.

It will be apparent due to the fact that the end 85e and 85f are somewhat shorter than half the length of the full straight portions 85a, 85b and 85c that each portion may slide inwardly and outwardly in the sleeve and longitudinally relative to each other. The parallel portions 85a and 85c of each support member section are provided with studs 90a and 90b whose outer ends are rigidly secured to the straight portions 85a and 85c at their midpoints by the welds 91.

The sleeves 88 are located parallel to and above the axes of pivotal connection of the connector members 55 and 56 so that as a particular link assembly pivots relative to its next adjacent link assembly about the axis of a rivet 74 as the particular link assembly changes direction as it moves about a direction changing roller 81, the end portions 85f and 85e of the support member sections mounted on such link assemblies may rotate in the sleeve 88 in which they are telescoped.

It will be apparent of course that if the end portions 85e and 85f of adjacent sections 80a were rigidly connected by one another, as by a sleeve rigid therewith, torsional forces would be imparted to all end portions and of course transmitted also to the other portions of the support member sections.

It will also be apparent that as each link assembly which changes direction as it moves about a vertical axis of a sprocket ring and relative to other support member sections to which it is connected by the sleeves 88, its end portions 85e and 85f may move longitudinally relative to the sleeves and the end portions of the other support member sections slidable in the sleeve to minimize tensional or compressional stresses in the end portions.

The studs 90a and 90b extend rotatably through the tubular connectors 61 and straight of the link assemblies 58 and are secured against withdrawal therefrom by inwardly by self locking nuts 92 threaded on the inner ends of the studs. The nuts may have plastic inserts 93 which lock the nuts in any position to which they are threaded on the studs. If desired, washers 94 may be interposed between the inner ends of the tubular connectors and the nuts 92. Alternatively, the studs 90 may be secured against withdrawal from the tubular connectors by self-tapping nuts threaded thereon which are available commercially under the name "Tinnerman".

The inner ends of the studs 90 by which the support member 15 is connected to the draw member 20 extend inwardly of the inner link plates 58 of the link assemblies 54 and, accordingly, the direction changing rollers 81, FIG. 8, mounted on horizontal shafts 87 have central annular external recesses or grooves 88 to which the inner end portions of the studs and the nuts thereon may extend and an outer internal recess 99 which provides external annular support surfaces 101 and 102 which extend laterally outwardly from the outer end of the central annular recess to the annular stop surfaces 103 and 104 which define the sides of the groove 99 and which are engageable with the outer edge surfaces of the lateral extensions 58a and 58b of the inner link plates 58 to help maintain the conveyor properly aligned on the rollers.

The rollers 81, may, if desired, be rigidly secured to the shafts 97 on which they are mounted by keys 105 which are receivable in aligned slots 106 and 107 of the rollers and the shafts, respectively.

In use, if it is desired that certain objects or articles, such as meat patties, bread, buns, or the like be subjected to predetermined conditions, such as high or low temperatures for a predetermined period of time, such conditions are established in the chamber 12 by means not shown. The walls of the housing 11 are insulated to minimize the transfer of heat between the chamber and exterior thereof. The motor 20 is then energized and the drive frame 15 is rotated in a counter clockwise manner as seen from above, FIG. 1. The side edge surfaces 18 of the teeth 17 of the ring sprockets mounted on the drive frame engage the cylindrical portions 68 of the connector member 56 of the draw member in the manner described above and move the conveyor 14 in the closed continuous path as indicated by the arrows in FIG. 1 and 2. The idler sprocket rings 32 on the carriages 31a and 31b are rotated by the draw member due to the engagement of the cylindrical portions 63 of the connector members with the side edge surfaces 19 of the teeth 17 of the idler sprocket rings.

The objects to be subjected to the predetermined conditions are deposited on the portion 110 of the conveyor between the front wall of the housing and the direction changing roller 81. The portion 111 of the conveyor moves rearwardly from the direction changing roller 81 to the bottom driver frame sprocket ring 16b. The conveyor then moves about the lower drive sprocket ring 16b and into the portion 112 of its path of movement between the bottom drive sprocket ring 16b and the idler sprocket ring 32 on the top carriage 31a and then rearwardly to the upper drive sprocket ring in the portion 113 of its path of movement, about the upper sprocket ring and to a direction changing roller 81b in the portion 114 of its path of movement.

After moving over the direction changing roller 81b, the conveyor moves downwardly in the portion 115 of its path of movement and about the direction changing roller 81a. The articles which have been carried by the conveyor will, of course, then be delivered or fall into a suitable receptacle positioned below the roller 81a. The conveyor then moves rearwardly in the portion 116 of its path of movement from a direction changing roller 81 in the portion 117 of its path of movement. It will be apparent, of course, that since the carriages 31a and 31b are biased forwardly and rearwardly, respectively, all portions of the conveyor are kept under a predetermined equal tension.

The straight portions of the support member 50 as they move between the various sprocket rings and the direction changing rollers are supported by the slide bars or ribs 42 which are spaced from and on either side of the longitudinal draw members 54. Such slide bars, may also extend or curve at locations of the sprocket rings. The movable carriages also have mounted thereon the slide members or ribs 41. The support member is thus supported not only by the draw member, but also by the slide bars in the various portions of its paths of movement between the sprocket rings and the direction changing rollers of such conveyor system. It will be apparent, of course, that while a particular path of movement has been illustrated and described for the conveyor 14, the path of movement may be varied as required in different applications and installations.

It will be seen that since only the alternate portions 85a and 85c of the sections 85 of the support member are connected to the draw member, the other portions 85b between the draw member connected straight portions and the end portions 85a and 85f are not directly connected to the draw member. Relatively great flexibility is thus provided and afforded the support member which permits it to flex as it curves about either the vertical axes around the sprocket rings or about horizontal axes of the direction changing rollers 81. It will also be apparent that two bight portions 86 and 87 of the support member and one free straight portion 85b are interposed between each adjacent pair of studs 90a and 90b secured to each link assembly of the draw member. Similarly, the end portions 85e and 85f of adjacent support member sections, and two bight portions 86b and 87a are interposed between adjacent pairs of studs of adjacent panel sections. The support member may thus flex resiliently at two opposed bight portions between the locations of connection of adjacent pairs of studs to the draw member.

It will further be seen that since the studs are rotatable relative to the draw member about vertical axes and the connected end portions of adjacent sections of the support member are slidable and rotatable in the sleeves, as the support member moves in curved portions of its path of movement about vertical axes, the stresses and strains imposed on the support member are minimized.

It will now be seen that a new and improved conveyor has been illustrated and described which is of simple economical structure and to which a support member, such as the support member 50, may be easily and quickly connected.

It will further be seen that the draw member comprises a plurality of link assemblies 54 each having a pair of parallel longitudinally extending link plates, such as 58 and 59, which are connected to one another at longitudinally spaced locations by the tubular connectors 61 and 62, and that adjacent ends of adjacent link assemblies 54 of the draw member are connected by co-engageable pairs of connector members 55 and 56, one of which has a cylindrical portion pivotally disposed about the adjacent tubular connector of one of the pair of link assemblies 54 and the other of which has a cylindrical portion rotatably disposed about the adjacent tubular connector of the other link assembly, the two connector members having overlapping longitudinally extending extensions which are pivotally connected by rivets 70 for pivotal movement about a horizontal axis which is perpendicular to and located between the axes of the tubular connectors of the pair of link assemblies.

It will further be seen that the tubular connectors provide a simple, economical means for rotatably connecting the support member to the draw member at longitudinally spaced locations.

Figure 9:
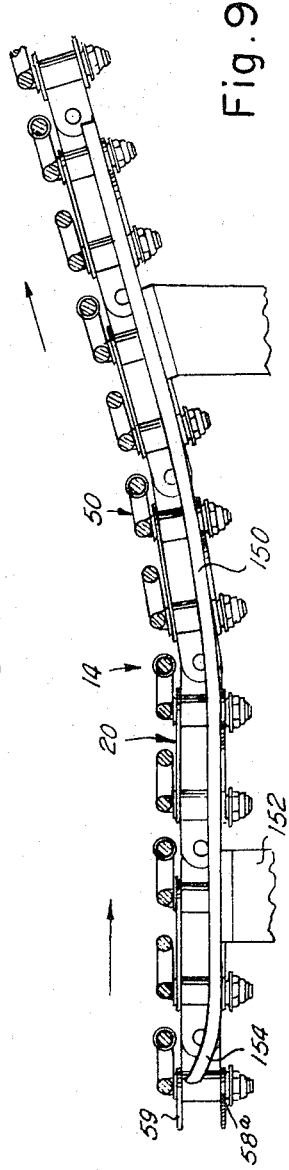

Referring now particularly to FIG. 9 of the drawing, a direction changing slide bar 150 is illustrated which may be used to change the direction of movement of the conveyor instead of a direction changin roller 81. The slide bar 150 may be mounted on any suitable brackets 152 and extends inwardly over the extensions 58a and 58b at one side of the draw member. A similar slide bar on the opposite side of the draw member may extend over and be engageable by other lateral extensions 58a or 58b of the links 58 of the draw member. The slide bar 150 preferably is of a low friction substance such as Nylon, Teflon or the like and is provided at least at one end with a curved end portion 154 to facilitate the engagement of the extensions of the plates 58 therewith. It will thus be seen that due to the provision of the extensions on the lower link plates of the assembly 54, that the direction of vertical movement of the draw member and therefore, of the conveyor may be changed by slide bars instead of rotatable rollers.

The foregoing description of the invention is explanatory only and changes in the details of the construction illustrated may be made by those skilled in the art, with the scope of the appended claims, without departing from the spirit of the invention.

What is claimed and desired to be secured by Letters Patent is:

1. A conveyor including: an elongate draw member comprising a plurality of longitudinally spaced link assemblies, and pivotally connected pairs of connector members connecting adjacent ends of adjacent pair of link assemblies, each pair of said connector members being pivotal relative to one another about a first axis and being pivotal relative to the link assemblies to which they are connected about longitudinally spaced second axes, said first and second axes being spaced longitudinally of said draw member and being perpendicular to one another; and a convoluted support member connected to said link assemblies; said support member having parallel straight portions spaced longitudinally relative to said draw member and extending laterally outwardly of each side of said draw member, and bight portions connecting opposite ends of said parallel straight portions, every other of said straight portions being connected intermediate its ends to a link assembly for pivotal movement about one of said axes, each of said link assemblies including a pair of elongate parallel inner and outer spaced plates and a pair of tubular connectors connecting said plates to one another, every other of said straight portions of said support member having mount means extending rotatably through said tubular connectors, and means engageable with said mount means and said link assemblies for preventing disengagement of said mount means from said tubular connectors.

2. The conveyor of claim 1, wherein each of said connector members comprises a tubular cylindrical portion rotatably disposed about the tubular connector of a link assembly and between its plates and having extension means extending longitudinally outwardly of said link plates, extension means of said pairs of connector members overlapping, and means pivotally connecting overlapped portions of each pair of said connector members.

3. The conveyor of claim 2, wherein said support member comprises a plurality of sections each section having a pair of mount means extending through said tubular connector members of a link assembly.

4. The conveyor of claim 2, wherein said support member comprises a plurality of sections, each of said sections comprising three intermediate parallel long straight portions and a pair of short end portions, said mount means being connected to a pair of said long straight portions, the third of said long straight portions being disposed between said pair of long portions, and means connecting adjacent end portions of adjacent sections of said support member, said connecting means permitting rotational and longitudinal movement of end portions connected relative to one another.

5. The conveyor of claim 4, wherein said end portions extend outwardly of and parallel to said first axes and between the second axes of adjacent link assemblies.

6. The conveyor of claim 5, wherein said connecting means comprises a tubular sleeve, end portions of adjacent sections of the support member being disposed in opposite end portions of sleeve and being rotatably and longitudinally movable therein a limited distance.

7. The conveyor of claim 6, wherein said sleeves have means limiting longitudinal movement thereof on said end portions.

8. The conveyor of claim 7 wherein said mounting means extend inwardly of said inner plates, said inner plates having lateral extensions extending laterally outwardly in opposite directions.

9. The conveyor of claim 7, and direction changing means for changing the direction of movement of said conveyor about an axis parallel to said first axes, said direction changing means comprising a circular member having an external annular recess for receiving inner end portions of said mounting means and annular support surfaces extending outwardly of said annular groove and engageable by said lateral extensions of said inner plates.

* * * * *